April 14, 1964          M. ROTHSTEIN          3,129,313

METHOD AND APPARATUS FOR RAPID CUTOFF OF OSCILLATIONS

Filed Dec. 7, 1960          2 Sheets-Sheet 1

INVENTOR.
Milton Rothstein
BY
Johnson and Kline
ATTORNEYS

April 14, 1964 M. ROTHSTEIN 3,129,313
METHOD AND APPARATUS FOR RAPID CUTOFF OF OSCILLATIONS
Filed Dec. 7, 1960 2 Sheets-Sheet 2
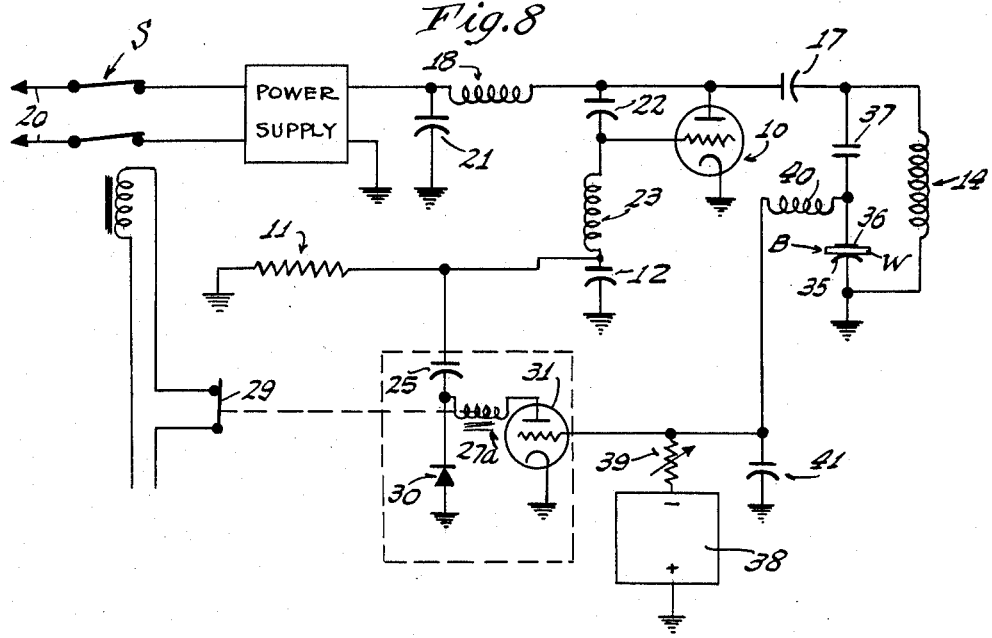
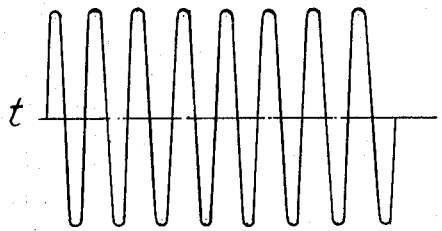
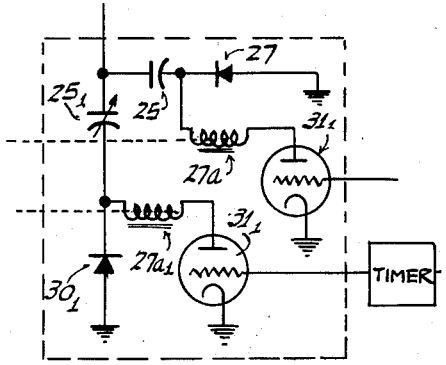
INVENTOR.
Milton Rothstein
BY
Johnson and Kline
ATTORNEYS United States Patent Office 3,129,313
Patented Apr. 14, 1964

3,129,313
METHOD AND APPARATUS FOR RAPID CUTOFF
OF OSCILLATIONS
Milton Rothstein, East Williston, N.Y., assignor to Willcox & Gibbs Sewing Machine Co., New York, N.Y., a corporation of New York
Filed Dec. 7, 1960, Ser. No. 74,395
18 Claims. (Cl. 219—10.77)

The present invention relates to the method and apparatus for rapidly cutting off the oscillations in a standard oscillator circuit.

In many cases where the oscillator is used for dielectric or induction heating or for generating ultrasonic energy, it may be necessary to cut off the oscillations and stop power delivery almost instantaneously to prevent damage to the material being treated or to control temperatures to a very precise limit. Heretofore, many methods have been used to cut off the oscillations, for example, by applying a high negative bias to the grid, open-circuiting the grid-leak resistor or short-circuiting the high voltage power supply. These means, however, have presented various problems in that they have not been rapid enough to prevent damage, or may set up conditions in the circuit which might cause damage; for example, by applying high negative bias they may cause abrupt changes in the plate current and thus generate excessive voltages in the leakage inductances of the power supply components which may be damaged thereby.

It is an object of the present invention to provide a method and apparatus for cutting off oscillations in an oscillator circuit quickly and without danger of damaging the components or the material or work being treated thereby.

This is accomplished by causing the circuit which produces a normal harmonic oscillation to be modified, in response to a predetermined condition which may be caused for example by a timing device, a change in condition in the work or in the work load circuit, to cause the normal oscillations to shift to intermittent oscillations in the oscillator circuit to periodically quickly cut off the oscillations. The intermittent oscillations have such a time period as will produce a time interval after the cutoff sufficient to permit mechanical devices to open the circuit or otherwise cut off the power to stop the operation of the device before the oscillations resume and without damage to the circuit or to the work or material being treated.

More specifically, the intermittent operation is produced by altering the time constant of the grid circuit so that it is substantially greater than the time constant of the oscillating circuit. While this may be accomplished in various ways, it is at present preferred to accomplish it by connecting into the grid circuit a condenser circuit having a condenser of large capacity in parallel with the grid-leak resistor. The condenser circuit can be modified for various types of operation and can be responsive to various conditions such as elapsed time, temperature or current flow. It can be rendered operative to control the grid control circuit by a mechanical switch, a relay or by an electronic switch to quickly alter the oscillating characteristic of the circuit.

A feature of the present invention is that it has, although acting very rapidly, a smoother change in plate current and consequently develops little excess voltage.

A further feature of the invention resides in the fact that the components in the capacitor circuit can be arranged to suit a wide variety of conditions and by the selection of the components and their operating values or characteristics the cutoff can be accurately and effectively accomplished.

Other features and advantages of the invention will be apparent from the specification and claims when considered in connection with the accompanying drawings in which:

FIG. 2 is an illustration of the normal harmonic oscillations of the circuit.

FIG. 8 is a diagram of another heating circuit showing a different capacitor control circuit.

FIG. 9 shows a modification of the capacitor circuit of FIG. 8 providing plural control.

Figure 1:
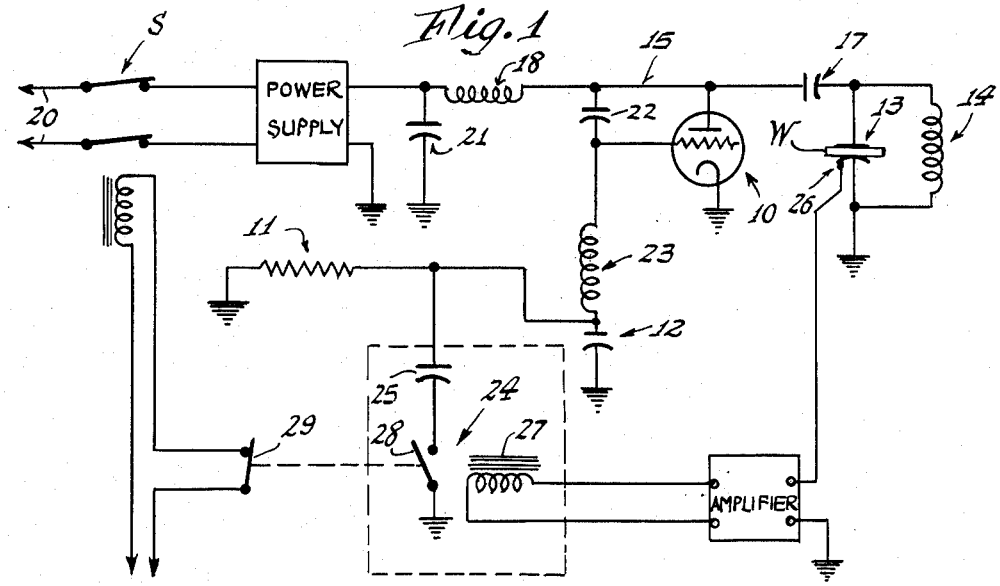
FIGURE 1 shows a heating circuit embodying the present invention.

While the method and apparatus of the present invention may be used in Colpitts, Hartley and the like standard oscillator circuits for quickly cutting off the oscillations therein for various purposes, it is herein illustrated in an inductive-grid oscillator, as shown in FIG. 1, to deliver high frequency power to a tank circuit having therein material or work to be dielectrically heated, which material is placed between electrodes constituting the tank capacitor.

Referring to FIG. 1 it will be seen that there is disclosed a standard inductive-grid oscillator circuit which includes an oscillator tube 10, which may be a triode, pentode, tetrode or the like, in which the D.C. grid voltage is built up by grid-leak resistor 11 and capacitor 12. Resistor 11 and capacitor 12 must be designed to have a time constant not greater than roughly the order of the time constant of the oscillator circuit to enable the D.C. grid bias to follow the ever present slight variations in the oscillation voltage on the grid of the oscillator tube. The tank capacitor 13 and tank inductor 14 constitute the frequency determining tank circuit and are connected to the high voltage line 15 through blocking capacitor 17. The high voltage line is connected through choke 18 to the high voltage terminal on the power supply. The power supply is connected by a normally open switch S, preferably a magnetic switch, to the power line or source 20. A bypass capacitor 21 is connected to the power line between the choke and power supply. The feed-back capacitor 22 is connected between the power line and grid and develops the oscillation frequency voltage across the grid inductance 23. The capacitance of capacitor 12 is generally large so that the oscillation frequency voltage across it is small in comparison with the voltage across inductance 23. This circuit will produce harmonic oscillations as shown in FIG. 2.

In accordance with the present illustrated form of the invention the workpiece W or material to be heated is disposed between the electrodes constituting the tank capacitor 13 to be dielectrically heated.

Figure 3:
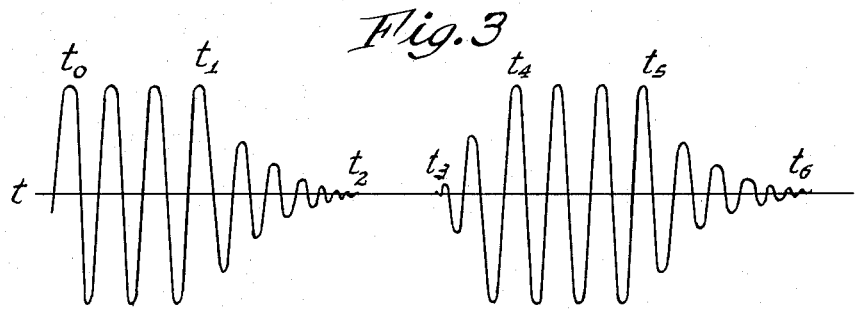
FIG. 3 is an illustration of the intermittent oscillations in the circuit.

In order to produce a very rapid cutoff of the oscillations in accordance with a preedtermined condition, such as faults in the load circuit of the oscillator, temperature levels or other conditions, the present invention provides means for altering the time constant of the grid circuit to a value substantially greater than the time constant of the oscillating circuit which will cause the oscillations in the circuit to shift from normal operation of FIG. 2 to intermittent oscillations which stop and start periodically as shown in FIG. 3.

While the time constant of the grid circuit may be changed by varying the grid-leak resistance, it is at present preferred to accomplish the change by inserting in parallel with the resistor 11, a capacitor circuit as illustrated in the dash block and provided with a switch means 24 and a capacitor 25 having a high capacitance when said predetermined condition exists. In the form of the invention shown in FIG. 1, the control is accomplished by a thermo-responsive means 26 which measures the temperature of the electrode upon which the work is supported. When the temperature reaches a predetermined value, the thermo-responsive means, which may be a thermostat or thermocouple, energizes the coil of the relay 27 through the amplifier and closes the switch contact 28. The relay 27 can be a D.C. relay which is small and light and can operate in a few milliseconds to place the capacitor 25 in parallel with the grid-leak resistor and shift oscillations to the intermittent oscillations of FIG. 3.

Referring to FIG. 3, the oscillations occurring between $t_0$ and $t_1$ represent the normal oscillations of FIG. 2. As soon as the switch 24 is closed inserting the capacitance in the circuit, the oscillations immediately change to an intermittent oscillation and decrease from $t_1$ to $t_2$ at which time the oscillations cease or cut off. When a sufficient amount of the charge has leaked off the capacitor 25, the oscillations will build up again from $t_3$ to $t_4$ at which time normal operation will commence and at a later time $t_5$ the oscillations will die out again to cut off. This periodic sequence of intermittent oscillation will continue so long as the capacitor 25 is in the circuit.

For an oscillator working in the 1 to 100 megacycle range, the time $t_1$–$t_2$ will be in the order of microseconds whereas the time $t_2$–$t_3$ will be many milliseconds. It will be seen, therefore, that the oscillations will be stopped rapidly and that there will be an interval of time thereafter in which other mechanical or electrical devices may be actuated to open the circuit. For example, the circuit to the magnetic switch S can include a contact 29 on relay 27 to be operated simultaneously with the contact 28 to open the circuit to the magnetic switch so that the magnetic switch can open the circuit in the interval between $t_2$ and $t_3$ while the oscillations have been cut out and no damage to the work or the circuit will occur and the intermittent oscillations will not be resumed at $t_3$. The usual magnetic switch will open in about one cycle or 1/60 of a second or less and this can be matched by the interval $t_2$–$t_3$ by selecting a proper value for the capacitor 25.

It will be seen, therefore, that the oscillator stops oscillating and delivering power to the tank capacitor load in microseconds while the relatively slower acting main power cutoff operates to remove the power before the next cycle of the intermittent oscillation can start.

Figures 4, 5, 6, 7:
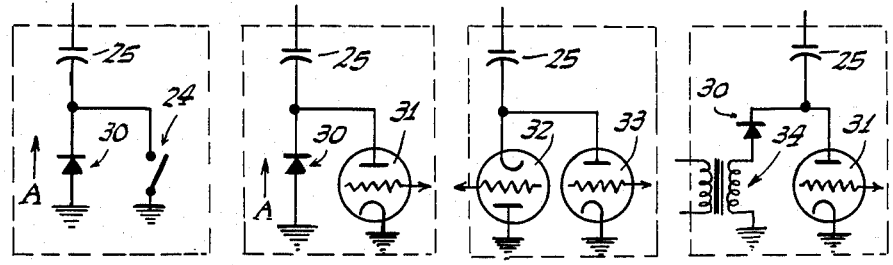
FIG. 4 is a modification of the capacitor circuit of FIG. 1.
FIG. 5 is another form of capacitor circuit employing an electron tube switch means.
FIG. 6 is another form of capacitor circuit employing an electron tube for the rectifier and the switch means.
FIG. 7 is another form of capacitor circuit for precharging the capacitor.

In practice it is usually desired to further decrease the time interval $t_1$–$t_2$. To accomplish this the capacitor circuit is modified, as shown in FIG. 4, by inserting a suitable rectifier 30 in shunt with the switch 24 and so arranging it that it permits current to flow into the capacitor 25 in one direction, as shown by the arrow A, so that the capacitor can be charged to the voltage developed across the grid-leak resistor, but it will not discharge because of the unidirectional flow characteristics of the rectifier. The charged capacitor has no effect on the oscillator because the capacitor cannot discharge. However, when the switch 24 is closed the capacitor immediately begins to discharge through the grid-leak resistor and cuts off the oscillation. Thus, the use of the rectifier decreases the time interval needed for cutoff by the time necessary to charge the capacitor.

Another advantage of this circuit is that the use of the rectifier prevents the capacitor from causing a momentary lowering of the grid bias voltage when the switch is closed which may cause a momentary pulse of power in the oscillating circuit at the start of the period.

A further advantage of the circuit embodying the rectifier is that it enables a simple unidirectional switch to be used. Such a circuit is shown in FIG. 5 wherein an electronic switch is used. Such electronic switch is highly desirable because of its simplicity and may include vacuum tubes, thyratrons, transistors and the like unidirectional elements. In the form of the invention illustrated in FIG. 5, a thyratron 31 is connected as the unidirectional discharge switch and the capacitor 25 which is charged through the rectifier will be discharged through the thyratron when the appropriate signal is put on the thyratron grid.

The simplicity of this circuit presents a substantial advantage for the thyratron requires no plate power supply and a small inexpensive thyratron may be used because very little voltage is developed across it. Further, the thyratron filament can be grounded. Grounding of the thyratron is advantageous because it allows the signaling circuit that feeds the grid to be at ground potential making it simple to connect to whatever device is to be measured. Further, the thyratron in operation is much more rapid than the relay-operated switch of FIGS. 1 and 3.

If it is desired to control the rate of charging and discharging of the capacitor 25, the present invention provides a vacuum tube 32 in the capacitor circuit in lieu of the rectifier 30 and a vacuum tube 33 in lieu of the thyratron 31 as shown in FIG. 6, and by controlling the grid of the vacuum tubes 32, 33 the rate of charge and discharge of the condenser can be controlled.

Under some circumstances it may be desired to have the capacitor 25 charged before the oscillator is turned on so as to give protection from the beginning of the operation of the oscillator instead of allowing the short delay needed for the oscillator to charge the capacitor at the start of the "on" period. This can be accomplished by including in the capacitor circuit a charging transformer 34 disposed between the rectifier 30 and ground which will effectively charge the capacitor 25 as soon as the transformer circuit is energized. Such a circuit is shown in FIG. 7.

FIG. 8 shows another application of the present invention embodying the electronic switch means for controlling the oscillations in response to a circuit condition in the tank circuit. In this form of the invention the oscillating circuit, which is similar to FIG. 1 with the capacitor circuit of FIG. 5 included therein, is used to supply heat-sealing power for plastic welding, the plastic or work W being heated being disposed between the electrodes 35, 36 of the tank capacitor 13 with electrode 35 being grounded and electrode 36 being isolated for D.C. by a capacitor 37. From the power supply 38 through a resistor 39 and inductor 40, a D.C. voltage is applied to the plastic load. The inductor 40 and capacitor 41 connected thereto serve as a filter to prevent high frequency power from feeding back to the power supply 38 or to the thyratron 31. The power supply 38 establishes a bias voltage on the grid of the thyratron, the value of this voltage depending upon the D.C. resistance of resistor 39 and the D.C. resistance of the load. When the load is heated, its resistance decreases. This decreases the bias on the grid. When the bias reaches a low point the thyratron 31 will become conductive so as to discharge the capacitor 25 and change the oscillations to intermittent oscillations. This sensing circuit will detect whether the material has reached a required temperature, if an arc through the material is about to occur, or if an arc has started, depending upon the values of the components in the circuit. A resistor 39 may be a variable resistor adjustable to select the desired values of resistance of the load as may be required to effect the control. It will be seen that the circuit enables the power delivered to the load to be cut off in a very few microseconds since the oscillations in the circuit would stop very rapidly after the grid of the thyratron is properly energized.

In order to permanently stop the oscillations after they have been stopped as a result of the change to intermittent operation, a relay coil 27a may be inserted in the plate circuit of the thyratron so as to be energized when the thyratron becomes conductive to discharge the condenser and open the switch 29 to open the power circuit 20 at switch S.

In some circumstances it may be desired to control the oscillation of the circuit in response to two conditions. In this situation the capacitor circuit of FIG. 9 is substituted for that of FIG. 8. As shown in FIG. 9 there is added to the capacitor circuit of FIG. 8 a parallel circuit having a capacitor $25_1$ which is connected in series with a control electron tube $31_1$ and is also connected to the rectifier $30_1$ and the plate circuit of the tube may have a relay $27a_1$ which is also connected to the switch 29. The control for the grid of the thyratron $31_1$ can be in accordance with another condition in the circuit or, as herein illustrated, by a timer which will cause the circuit to cut off oscillations upon a lapse of a predetermined time. This circuit has an advantage in that it allows less expensive timers to be used because they are in a low voltage circuit and puts less strain on the conventional switching devices used to turn off the main switch. The timer can be used to provide a further safety factor to cut off the circuit in the event that the conditions in the tank circuit have not cut off oscillations after a predetermined period. If desired, the capacitance of this circuit can be varied by switching other capacitors in parallel; however, in the illustrated form of the invention capacitor $25_1$ is an adjustable capacitor. By varying the capacity in the circuit the period of the intermittent oscillations set up by the timer circuit can be adjusted as required.

The present invention is particularly well suited in high speed sealing where the sealing time is very short and it is necessary to turn the power on and off since the signals sensitive to the electrical characteristics of the load can be used to trigger the thyratron to quickly stop and start the oscillations in the circuit in predetermined relation to the operation of the machine.

Another manner in which the circuit may be used in sealing, where the sealing time is required to be a short period, is to utilize the period of intermittent oscillation $t_4$–$t_5$ for the sealing period. This would eliminate conventional timing circuits and result in simpler, less expensive equipment.

Variations and modifications may be made within the scope of the claims and portions of the improvements may be used without others.

I claim:

1. In a device of the class described, an oscillator circuit including an electron tube having a grid circuit having a grid resistor therein, said circuit having a predetermined time constant not greater than the order of the time constant of the oscillator circuit for producing harmonic oscillations in the circuit, and means inserting a capacitor in parallel with said grid resistor for changing the time constant of the grid circuit to a value greater than the time constant of the oscillator circuit and causing the oscillations to shift from normal harmonic oscillations to intermittent oscillations in which the oscillations in the oscillator circuit are quickly cut off periodically.

2. In a device of the class described, an oscillator circuit including an electron tube having a grid circuit having a grid resistor therein, said circuit having a predetermined time constant not greater than the order of the time constant of the oscillator circuit for producing harmonic oscillations in the circuit, means inserting a capacitor in parallel with said grid resistor for changing the time constant of the grid circuit to a value greater than the time constant of the oscillator circuit and causing the oscillations to shift from normal harmonic oscillations to intermittent oscillations in which the oscillations in the oscillator circuit are quickly cut off periodically, and means for opening the oscillator circuit during a cutoff period to prevent further oscillations therein.

3. In a device of the class described, an oscillator circuit including an electron tube having a grid circuit including a resistor-capacitor combination having a predetermined time constant not greater than the order of the time constant of the oscillating circuit for producing harmonic oscillations in the circuit, and means for inserting a capacitor circuit in the grid circuit in parallel with said resistor for changing the time constant of the grid circuit to a value greater than the time constant of the oscillator circuit and causing the oscillations to shift from harmonic oscillations to intermittent oscillations in which the oscillations in the oscillator circuit are quickly cut off periodically.

4. The invention as defined in claim 3 wherein said capacitor circuit includes a capacitor and a normally non-conducting switch means in series therewith, said switch means upon becoming conductive causing said capacitor to become effective to change the time constant of the grid circuit.

5. The invention as defined in claim 4 wherein said capacitor circuit includes a rectifier in parallel with said normally non-conducting switch means to cause said capacitor to be charged prior to the switch means becoming conductive to thereby reduce the time of cutoff by an amount equal to the time required to charge said condenser.

6. The invention as defined in claim 5 wherein the rectifier has a transformer associated therewith to precharge the condenser.

7. The invention as defined in claim 5 wherein said rectifier is an electron tube having a controlled grid whereby the rate of charging of said condenser can be varied.

8. The invention as defined in claim 4 wherein said switch means comprises a relay operable in response to a predetermined condition to render the capacitor circuit conductive.

9. The invention as defined in claim 4 wherein said switch means comprises electron tube means having a grid controlled in response to a predetermined condition to render the capacitor circuit conductive.

10. The invention as defined in claim 4 wherein the capacitor is adjustable to vary the period of the intermittent oscillations.

11. The invention as defined in claim 4 wherein said capacitor circuit includes two capacitors in parallel and each having separate, normally non-conducting switch means series connected therewith and wherein separate control means are provided to render the non-conducting switches conductive in response to separate predetermined conditions.

12. In a high frequency dielectric heating system, heating means for heating material connected to an oscillator circuit for supplying high frequency electric energy to heat said material, said circuit including an electron tube having a grid circuit having a grid resistor therein, said circuit having a predetermined time constant not greater than the order of the time constant of the oscillator circuit for producing harmonic oscillations in the oscillator circuit, and control means controlled in response to a predetermined condition for inserting a capacitor circuit in said grid circuit in parallel with said grid resistor to change the time constant of the grid circuit to a value greater than the time constant of the oscillator circuit and causing the oscillations in the oscillator circuit to shift from harmonic oscillations to intermittent oscillations in which the oscillations in the oscillator circuit are quickly cut off periodically to stop the energy supplied to the heating means.

13. In a high frequency dielectric heating system, heating means for heating material connected to an oscillator circuit for supplying electric energy to heat said material, said circuit including an electron tube having a grid circuit having a predetermined time constant not greater than the order of the time constant of the oscillator circuit for producing harmonic oscillations in the oscillator circuit, means controlled by predetermined conditions in the heating means for rendering a capacitor circuit in said grid circuit operative to change the time constant of the grid circuit to a value greater than the time constant of the oscillator circuit and causing the oscillations to shift from harmonic oscillations to intermittent oscillations in which the oscillations in the oscillator circuit are quickly cut off periodically to stop the energy supplied to the heating means, and means operative during the cutoff period for rendering said oscillator circuit inoperative to supply energy to the heating means.

14. In a high frequency dielectric heating system, heating means for heating material connected to an oscillator circuit for supplying electric energy to heat said material, said circuit including an electron tube having a grid circuit having a predetermined time constant not greater than the order of the time constant of the oscillator circuit for producing harmonic oscillations in the oscillator circuit, and means controlled by a plurality of different predetermined conditions for inserting a capacitor circuit in said grid circuit to change the time constant of the grid circuit to a value greater than the time constant of the oscillator circuit and causing the oscillations to shift from harmonic oscillations to intermittent oscillations in which the oscillations are quickly cut off periodically to stop the energy supplied to the heating means, said capacitor circuit including two capacitors in parallel, each having a normally non-conducting switch means in series therewith to be independently controlled and rendered conductive in response to one of said predetermined conditions.

15. In a high frequency dielectric heating system, heating means for heating material connected to an oscillator circuit for supplying electric energy to heat said material, said circuit including an electron tube having a grid circuit having a predetermined time constant not greater than the order of the time constant of the oscillator circuit for producing harmonic oscillations in the oscillator circuit, and means for inserting a capacitor circuit in said grid circuit to change the time constant of the grid circuit to a value greater than the time constant of the oscillator circuit and causing the oscillations to shift from harmonic oscillations to intermittent oscillations in which the oscillations are quickly cut off to stop the energy supplied to the heating means, said capacitor circuit including two capacitors in parallel each having a normally non-conducting switch means in series therewith, one of said switch means being controlled by conditions in the heating circuit and the other by a timing means to render said switch means conductive to insert said capacitors in the grid circuit.

16. In the method of cutting off harmonic oscillations in an oscillating circuit including an oscillator tube having a grid circuit provided with a grid-leak resistor and a capacitor in which the time constant of the grid circuit is not greater than the order of the time constant of the oscillating circuit, the step of inserting a capacitance in the grid circuit in parallel with said grid-leak resistor and altering the time constant of the grid circuit to a value substantially greater than the time constant of the oscillating circuit to shift said circuit to intermittent operations in which the oscillations quickly cut off periodically.

17. In the method of cutting off harmonic oscillations in an oscillating circuit including an oscillator tube having a grid circuit provided with a grid-leak resistor and a capacitor in which the time constant of the grid circuit is not greater than the order of the time constant of the oscillating circuit, the step of inserting a capacitance in the grid circuit in parallel with said grid-leak resistor and altering the time constant of the grid circuit to a value substantially greater than the time constant of the oscillating circuit to shift said circuit to intermittent operations in which the oscillations quickly cut off periodically, and permanently opening the oscillating circuit during a cutoff period to prevent further operation of said oscillating circuit.

18. In the method of cutting off harmonic oscillations in an oscillating circuit including an oscillator tube having a grid circuit provided with a grid-leak resistor and a capacitor in which the time constant of the grid circuit is not greater than the order of the time constant of the oscillating circuit, the step of rendering a separate capacitor circuit in parallel with said grid-leak resistor conductive to alter the time constant of the grid circuit to a value substantially greater than the time constant of the oscillating circuit to shift said circuit to intermittent operations in which the oscillations quickly cut off periodically.

References Cited in the file of this patent

UNITED STATES PATENTS

| | | |
|---|---|---|
| 2,477,634 | Lowe | Aug. 2, 1949 |
| 2,537,065 | Lester et al. | Jan. 9, 1951 |
| 2,594,420 | Gillespie | Apr. 29, 1952 |
| 2,607,895 | Bradley et al. | Aug. 19, 1952 |
| 2,638,529 | Gard | May 12, 1953 |
| 2,868,941 | Hickok | Jan. 13, 1959 |
| 2,896,055 | Kohler | July 21, 1959 |
| 2,974,293 | Fryklund | Mar. 7, 1961 |